(12) United States Patent
Bacurin

(10) Patent No.: US 9,243,568 B2
(45) Date of Patent: Jan. 26, 2016

(54) HOUSING OF A FRESH GAS SUPPLY DEVICE FOR AN INTERNAL COMBUSTION ENGINE AND FRESH GAS SUPPLY DEVICE

(75) Inventor: Mario Bacurin, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 817 days.

(21) Appl. No.: 13/298,795

(22) Filed: Nov. 17, 2011

(65) Prior Publication Data

US 2012/0110998 A1 May 10, 2012

Related U.S. Application Data

(63) Continuation of application No. PCT/EP2010/003057, filed on May 19, 2010.

(30) Foreign Application Priority Data

May 20, 2009 (DE) .................. 10 2009 022 229

(51) Int. Cl.
| | |
|---|---|
| *F02B 33/44* | (2006.01) |
| *F02D 9/10* | (2006.01) |
| *F02B 37/04* | (2006.01) |
| *F02D 9/02* | (2006.01) |
| *F02D 9/08* | (2006.01) |
| *F02D 23/02* | (2006.01) |
| *F02D 11/10* | (2006.01) |

(52) U.S. Cl.
CPC .............. *F02D 9/1035* (2013.01); *F02B 33/44* (2013.01); *F02B 37/04* (2013.01); *F02D 9/02* (2013.01); *F02D 9/08* (2013.01); *F02D 23/02* (2013.01); *F02D 11/10* (2013.01); *Y02T 10/144* (2013.01)

(58) Field of Classification Search
CPC ............ F02B 33/44; F02B 37/04; F02D 9/02; F02D 9/1035; F02D 23/02; F02D 9/08; F02D 11/10; Y02T 10/144
USPC ............................ 60/611, 605.1; 123/568.21
See application file for complete search history.

(56) References Cited

U.S. PATENT DOCUMENTS 1,921,736 A * 8/1933 Erade ........................ 261/64.1
5,064,423 A * 11/1991 Lorenz et al. ................ 60/611
5,666,930 A    9/1997 Elder (Continued)

FOREIGN PATENT DOCUMENTS

| DE | 20 2004 006 242 U1 | 10/2004 |
| DE | 103 61 913 A1 | 9/2005 |

(Continued)

OTHER PUBLICATIONS

International Search Report dated Aug. 30, 2010 with English translation (six (6) pages).

(Continued)

*Primary Examiner* — Kenneth Bomberg
*Assistant Examiner* — Paolo Isada
(74) *Attorney, Agent, or Firm* — Crowell & Moring LLP

(57) ABSTRACT

A housing for a fresh gas supply device for an internal combustion engine with a turbocharger, includes a fresh gas connecting section which connects a charge air inlet and an air outlet. The housing has a main housing part and a housing cover, which can be removed from and secured to the main housing part. A corresponding fresh gas supply device includes the housing.

16 Claims, 2 Drawing Sheets

(56) References Cited

U.S. PATENT DOCUMENTS

| | | | |
|---|---|---|---|
| 5,819,538 A * | 10/1998 | Lawson, Jr. | 60/611 |
| 6,722,128 B1 * | 4/2004 | Adrian | 60/600 |
| 7,926,271 B2 | 4/2011 | Nemeth et al. | |
| 7,934,492 B2 * | 5/2011 | Gerum | 123/568.21 |
| 2007/0144483 A1 | 6/2007 | Torii et al. | |
| 2008/0066467 A1 * | 3/2008 | Nemeth et al. | 60/606 |
| 2008/0072595 A1 * | 3/2008 | Nemeth et al. | 60/605.1 |
| 2009/0235663 A1 * | 9/2009 | Nemeth et al. | 60/600 |
| 2010/0228464 A1 * | 9/2010 | Gerum | 701/103 |
| 2011/0041496 A1 * | 2/2011 | Mayr | 60/611 |

FOREIGN PATENT DOCUMENTS

| | | |
|---|---|---|
| DE | 10 2006 008 783 A1 | 9/2006 |
| EP | 1 957 776 B1 | 3/2009 |
| JP | 10-213019 A | 8/1998 |
| JP | 2002-371920 A | 12/2002 |
| WO | WO 2006/089779 A1 | 8/2006 |

OTHER PUBLICATIONS

German Office Action dated Feb. 12, 2010 with English translation (six (6) pages).

International Preliminary Report on Patentability dated Dec. 8, 2011 (ten (10) pages).

* cited by examiner

HOUSING OF A FRESH GAS SUPPLY DEVICE FOR AN INTERNAL COMBUSTION ENGINE AND FRESH GAS SUPPLY DEVICE

CROSS-REFERENCE TO RELATED APPLICATIONS

This application is a continuation of PCT International Application No. PCT/EP2010/003057, filed May 19, 2010, which claims priority under 35 U.S.C. §119 from German Patent Application No. DE 10 2009 022 229.4, filed May 20, 2009, the entire disclosures of which are herein expressly incorporated by reference.

BACKGROUND AND SUMMARY OF THE INVENTION

The invention relates to a housing of a fresh gas supply device for an internal combustion engine with an exhaust gas turbocharger, and to a corresponding fresh gas supply device.

Internal combustion engines, for example diesel engines, are usually equipped with exhaust gas turbochargers. FIG. 1 is a diagrammatic illustration of an internal combustion engine 12, the exhaust gas line 21 of which is coupled to an exhaust gas turbine 14 of an exhaust gas turbocharger 13. The exhaust gas turbine 14 is coupled to a compressor 15 which compresses intake air from a fresh air inlet 23 in order to increase an intake pressure in an intake line 20 for the internal combustion engine 12 after running through a charge air cooler 16. As a result, for example, acceleration performance of the vehicle having the internal combustion engine 12 is improved, and a reduction in the energy consumption can be achieved. In order to reduce what is known as the "turbo lag", in which the internal combustion engine reacts to the accelerator with a speed increase only after a certain delay time, compressed air, for example from a compressed air store 18, which is fed by a compressor 17 driven (double strokes) by the internal combustion engine 12, is introduced through a compressed air line 19 in a controlled manner into the intake line 20 of the internal combustion engine 12, in order to cover the intake air demand in the event of an increased intake air demand of the internal combustion engine 12. This takes place by way of a fresh gas supply device 11, which is arranged between the compressor 15 of the turbocharger 13 or the charge air cooler 16 connected downstream in the flow direction and the intake line 20.

The fresh gas supply device 11 is connected by way of a charge air inlet 2 to the charge air cooler 16, by way of an outlet 7 to the intake line 20, and by way of a compressed air inlet 8 via the compressed air line 19 to the compressed air store 18. WO 2006/089779 A1 describes a fresh gas supply device 11 of this type in detail.

A fresh gas supply device of this type has a disadvantageously high number of parts and a correspondingly long assembly and installation time.

It is therefore the object of the present invention to provide an improved fresh gas supply device.

This and other objects are achieved by a housing of a fresh gas supply device for an internal combustion engine with an exhaust gas turbocharger. A fresh gas connecting section connects a charge air inlet and an air outlet. The housing has a housing main part and a removable housing cover which is fastened to the housing main part.

A fresh gas supply device having a housing for an internal combustion engine with an exhaust gas turbocharger accordingly has a charge air inlet for the inlet of compressed charge air out of the exhaust gas turbocharger; an outlet which is connected to the charge air inlet by a fresh gas line section which can be closed via at least one flap element pivotable about a rotational axis; and at least one compressed air inlet for the inlet of compressed air into the outlet. It is possible for compressed air to be fed to the outlet via the at least one compressed air inlet, via a quantity regulating device which has a closed position and any desired number of open positions. An adjusting device adjusts the at least one flap element in such a way that a completely open position of the at least one flap element is assigned to a completely closed position of the quantity regulating device. The housing has a housing main part and a housing cover.

A simple implementation in terms of production technology is therefore achieved, such as both in an embodiment as a rough cast part and in the machining of the rough cast part.

Simple assembly is made possible by a split housing which consists of a housing main part and a housing cover. The housing main part and the housing cover can be fastened to one another removably along dividing faces, the dividing faces extending in a plane which lie substantially transversely with respect to the longitudinal axis of the fresh gas connecting section. As a result, it is possible to fit the two housing parts together in a simple way with functional components.

Here, the housing main part has the charge air inlet which communicates with the fresh gas connecting section and the housing cover has the air outlet which is connected to the fresh gas connecting section. It is therefore advantageously simple to install a flap element, for the installation of which the housing main part is provided, into the fresh gas line section. To this end, the flap element is arranged, for example, in the vicinity of the dividing location of the housing parts, which accelerates and simplifies installation considerably.

A combination of different functions in one housing part results in an advantageous reduction of components.

Thus, for example, the housing cover has at least one compressed air inlet for connecting a compressed air line. The at least one compressed air inlet communicates with the air outlet via an outlet. It is provided here that the housing is configured with a receiving recess for installing at least one quantity regulating device between the at least one compressed air inlet and the outlet.

It is particularly advantageous if the receiving recess is formed into at least one dividing face between the housing main part and the housing cover, since therefore the functional parts can be inserted, before the attachment of the housing cover, into the latter or into the dividing face on the housing main part and are fixed by the attachment of the housing cover.

In a similar way, it is provided that the housing is configured with a receptacle for installing at least one non-return valve between the at least one compressed air inlet and the outlet. Here too, this receptacle can be formed into at least one dividing face between the housing main part and the housing cover, which results in simple assembly and construction.

The housing cover therefore serves, moreover, as a cover for the quantity regulating device and contains the non-return valves which, as a result, do not require any additional housings and/or holders.

A fresh gas supply device has the above-described housing.

Other objects, advantages and novel features of the present invention will become apparent from the following detailed description of one or more preferred embodiments when considered in conjunction with the accompanying drawings.

DETAILED DESCRIPTION OF THE DRAWINGS

Identical components and functional units with an identical function are labelled by identical designations in the figures.

Figure 1:
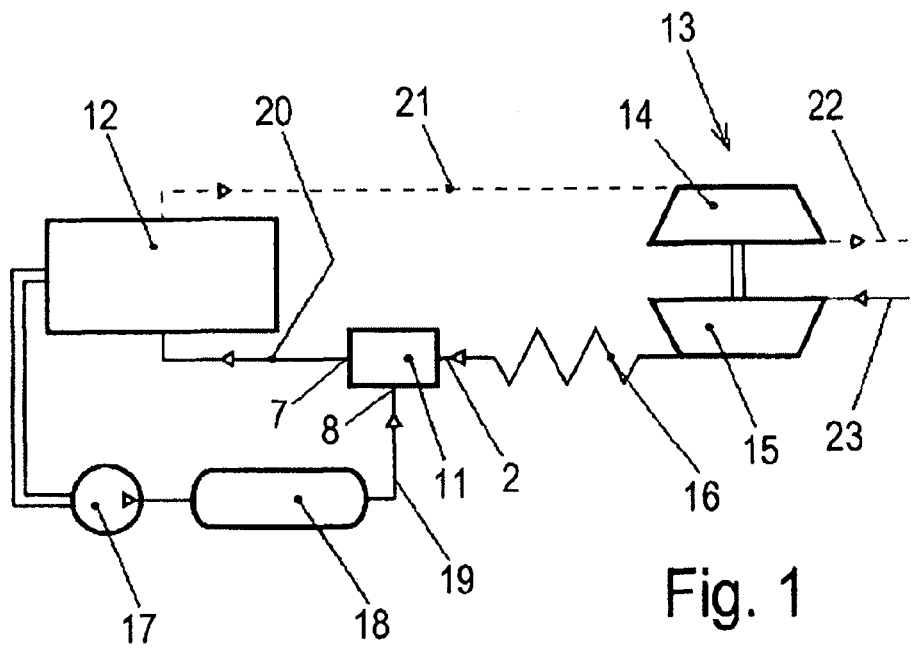
FIG. 1 is a diagrammatic illustration of a known internal combustion engine with an exhaust gas turbocharger and a fresh gas supply device.
Figure 2:
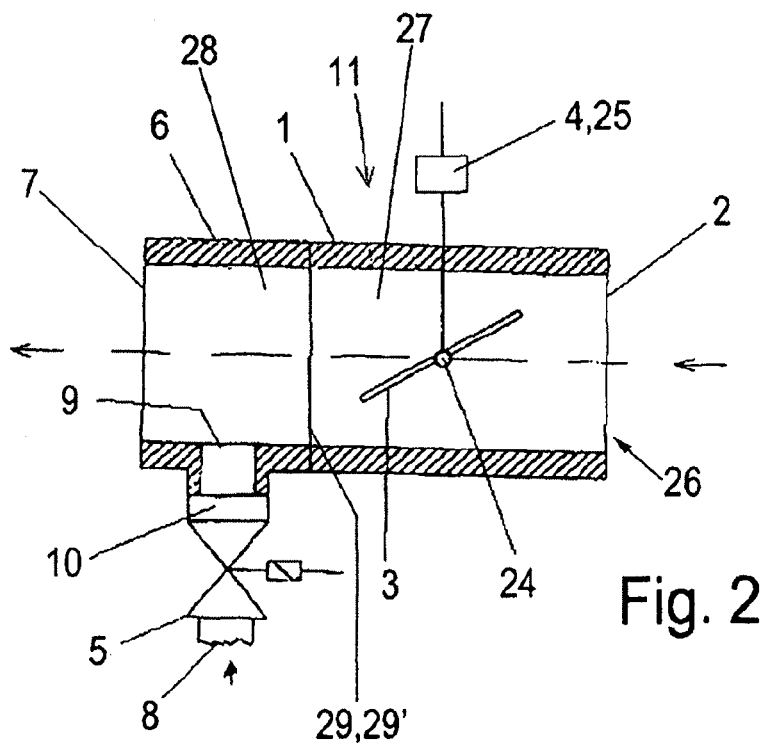
FIG. 2 is a diagrammatic illustration of an exemplary fresh gas supply device according to the invention.

FIG. 1 has already been described above. FIG. 2 is a diagrammatic illustration of a first exemplary embodiment of a fresh gas supply device 11 according to the invention. The fresh gas supply device 11 has a housing which consists of a housing main part 1 and a housing cover 6, which cover is attached to the housing main part 1. The two housing parts 16 are connected to one another at a dividing face 29, 29'. In this example, the dividing faces 29, 29' lie in a plane which runs transversely with respect to the longitudinal axis of a fresh gas line section 26.

The housing main part 1 is provided with the charge air inlet 2 which is arranged on the right in FIG. 2. The charge air, which is compressed by the compressor 15 of the exhaust gas turbocharger 13, flows in the arrow direction into the charge air inlet 2 and out of an air outlet 7.

The charge air inlet 2 is adjoined by the fresh gas supply section 26, which extends further through the housing cover 6 to an air outlet 7 which is connected to the intake line 20 of the internal combustion engine 12 (see FIG. 1). The fresh gas line section 26 consists of an inlet section 27 within the housing main part 1 and an outlet section 28 within the housing cover 6, which outlet section 28 adjoins the inlet section 27 in the longitudinal direction of the fresh gas line section 26.

Figure 3:
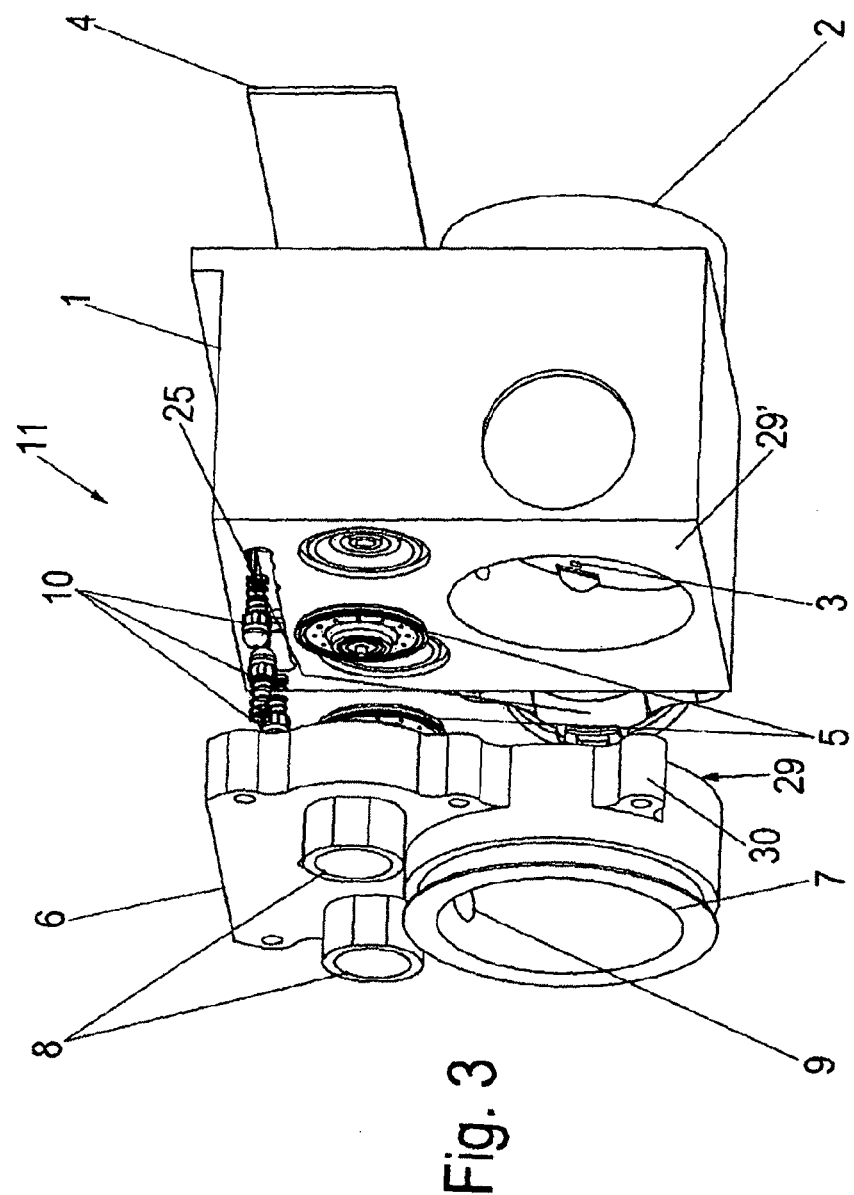
FIG. 3 is a perspective illustration of one exemplary embodiment of the fresh gas supply device according to the invention in a partially assembled position.

A flap element 3 is situated in the inlet section 26, which flap element 3 is arranged such that it can be pivoted about a flap axis 24 in the vicinity of the dividing faces 29, 29' (see, in particular, FIG. 3). In this example, the flap element 3 is connected to an actuating device 25. The actuating device 25 is controlled by a control device 4.

An outlet 9 is arranged close to the air outlet 7 in the outlet section 28. The outlet 9 is connected to a quantity regulating device 5 via a non-return valve 10. The quantity regulating device 5 is shown only diagrammatically. The quantity regulating device 5 is connected via a compressed air inlet 8 to a compressed air line 19 (see FIG. 1). In this embodiment, the quantity regulating device 5 is also connected to the control device 4 for control purposes. The quantity regulating device 5 can have one closed position and any desired number of open positions.

In the case of a torque request with a high air requirement, the exhaust gas turbocharger 13 cannot supply this air immediately. Compressed air is then additionally blown via the quantity regulating device 5 and the non-return valve 10 through the outlet 9 and into the outlet section 28. From there, the blown air passes through the air outlet 7 into the intake line 20 (see FIG. 1).

The non-return valve 10 serves for mechanical safeguarding in the case of a pressure drop at the compressed air inlet 8, in order to prevent charge air from flowing out of the outlet section 28.

When compressed air is blown into the outlet section 28, first of all the flap element 3 is pivoted about the flap axis 24 into a position such that the inlet section 27 is closed, in order that the supplied compressed air flows out of the outlet 9 in a manner which is directed into the air outlet 7 and not into the compressor 15.

As a result of the fact that the flap element 3 is closed, the charge air pressure of the exhaust gas turbocharger 13, which receives a corresponding exhaust gas flow, accelerates more rapidly as a result of the additional compressed air which is fed to the internal combustion engine 12. The charge air pressure is thus also increased more rapidly. When the charge air pressure reaches a defined value, the quantity regulating device 5 is closed (in a manner not described in greater detail) and the flap element 3 is opened again.

FIG. 3 is a perspective illustration of one exemplary embodiment of the fresh gas supply device 11 according to the invention in a partially assembled position.

The housing main part 1 is of approximately cubic design and, on its rear side which lies on the right in FIG. 3, has the charge air inlet 2, to which the inlet section 27 adjoins cylindrically (see FIG. 2) and extends through the housing main part 1 in the lower half and emerges on the opposite side on a dividing face 29'. The flap element 3, which is operatively connected to the actuating device 25, is arranged in the vicinity of the dividing face 29'. The actuating device 25 is arranged on a lateral side face of the housing main part 1 and is connected to the control device 4, which is attached to the rear side of the housing main part 1 above the charge air inlet 2.

A corresponding dividing face 29 of the housing cover 6 lies opposite the dividing face 29'. The housing cover 6 is shown here in an unassembled state (not yet attached to the housing main part). It has the air outlet 7, which points to the left in FIG. 3, and has an outlet section 28 of short design here (see FIG. 2), which outlet section 28 extends the inlet section 27 when the housing cover 6 is attached and forms the fresh gas line section 26 together with the inlet section 27.

Here, the housing cover 6 can be connected to the housing main part 1 via fasteners, for example screws or bolts, which is indicated by a projecting fastening bracket 30.

In this example, two compressed air inlets 8 which lie next to one another are arranged above the air outlet 7. They are connected to recesses in the dividing face 29 (not shown here, but readily understood), in which recesses two quantity regulating devices 5 are received. The quantity regulating devices 5 are provided for being received in recesses which are formed into the opposite dividing face 29' of the housing main part 1. Furthermore, receptacles for non-return valves 10 (see FIG. 2) are provided in the dividing faces 29 and 29' above the recesses for the quantity regulating devices 5. When the cover is attached, the non-return valves 10 and the quantity regulating devices 5 are held in their respective recesses and do not require any additional housings. Their recesses in the dividing face 29' of the housing main part 1 are only receptacles here. On the opposite side of the corresponding dividing face 29 of the housing cover 6, their receptacles are provided, for example, with valve seats, as is readily conceivable, and are connected to the compressed air inlets 8. Furthermore, the recesses communicate by way of their outlets via one or more outlets 9 to the air outlet 7, in the inner wall of which they open. The inner lines and connections in the housing cover are readily understood to one skilled in the art using the diagrammatic illustration according to FIG. 2.

Furthermore, the control device 4 is connected to pressure sensors (not shown) in the inlet section 27 and in the outlet section 28, as is described, for example, in WO 2006/089779 A1.

In other embodiments, for example, more than two compressed air inlets 8, more quantity regulating devices 5 and more non-return valves 10 can be provided. The shape of the housing can also be different, such as cylindrical.

| Table of Reference Numerals | |
|---|---|
| 1 | Housing main part |
| 2 | Charge air inlet |
| 3 | Flap element |
| 4 | Control device |
| 5 | Quantity regulating device |
| 6 | Housing cover |
| 7 | Air outlet |
| 8 | Compressed air inlet |
| 9 | Outlet |
| 10 | Non-return valve |
| 11 | Fresh air supply device |
| 12 | Internal combustion engine |
| 13 | Exhaust gas turbocharger |
| 14 | Exhaust gas turbine |
| 15 | Compressor |
| 16 | Charge air cooler |
| 17 | Compressor |
| 18 | Compressed air store |
| 19 | Compressed air line |
| 20 | Intake line |
| 21 | Exhaust gas line |
| 22 | Exhaust gas outlet |
| 23 | Fresh air inlet |
| 24 | Flap axis |
| 25 | Actuating device |
| 26 | Fresh gas line section |
| 27 | Inlet section |
| 28 | Outlet section |
| 29, 29' | Dividing face |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A housing of a fresh gas supply device for an internal combustion engine having an exhaust gas turbocharger, comprising:
    a housing main part; and
    a removable housing cover fastenable to the housing main part;
    wherein
        a fresh gas connecting section is formed in the housing extending between a charge air inlet of the housing and an air outlet of the housing,
        a first portion of the fresh gas connecting section in the housing main part is in fluid communication with the charge air inlet,
        a second portion of the fresh gas connecting section in the removable housing cover is in fluid communication with the air outlet, and
        the housing cover comprises at least one compressed air inlet configured to receive a compressed air line, the at least one compressed air inlet communicating with the air outlet via at least one outlet into the fresh gas line section upstream of the air outlet and downstream of the flap element.

2. The housing according to claim 1, further comprising a dividing face formed, respectively, on each of the housing main part and the housing cover, the dividing faces extending in a plane lying substantially transversely with respect to a longitudinal axis of the fresh gas connecting section.

3. The housing according to claim 2, wherein the housing main part includes the charge air inlet communicating with the fresh gas connecting section and the housing cover includes the air outlet communicating with the fresh gas connecting section.

4. The housing according to claim 2, wherein the housing main part is configured for installation of a flap element in the fresh gas connecting section.

5. The housing according to claim 1, wherein the housing main part is configured for installation of a flap element in the fresh gas connecting section.

6. The housing according to claim 1, wherein the housing is configured with at least one recess in which at least one quantity regulating device is installed, the at least one quantity regulating device being configured to regulate flow of compressed air, between the at least one compressed air inlet and the at least one outlet.

7. The housing according to claim 6, wherein the recess is formed in at least one dividing face between the housing main part and the removable housing cover.

8. The housing according to claim 7, wherein the housing is configured with a receptacle in which at least one non-return valve is installed between the at least one compressed air inlet and the outlet.

9. The housing according to claim 1, wherein the housing is configured with a receptacle in which at least one non-return valve is installed between the at least one compressed air inlet and the outlet.

10. The housing according to claim 9, wherein the receptacle is formed in at least one dividing face between the housing main part and the housing cover.

11. A fresh gas supply device for an internal combustion engine equipped with an exhaust gas turbocharger, comprising:
    a housing comprising a housing main part and a housing cover;
    a charge air inlet configured to receive compressed charge air out of the exhaust gas turbocharger;
    an air outlet connected to the charge air inlet via a fresh gas line section with the housing, the fresh gas line section including a flap element configured to selectively close off the compressed charge air from the air outlet, a first portion of the fresh gas connecting section in the housing main part being in fluid communication with the charge air inlet and a second portion of the fresh gas connecting section in the removable housing cover is in fluid communication with the air outlet;
    at least one compressed air inlet for inletting compressed air into the fresh gas line section upstream of the air outlet and downstream of the flap element;
    at least one quantity regulating device configured to regulate flow of compressed air through the at least one compressed air inlet into the fresh gas line section, said at least one quantity regulating device being operable between a completely closed position and one or more open positions; and
    an actuating device operatively configured to adjust the flap element, wherein a completely open position of the flap element corresponds to the completely closed position of the at least one quantity regulating device.

12. The fresh gas supply device according to claim 11, wherein the housing main part includes a first portion of the fresh gas line section having the flap element; and
    wherein the housing cover includes a second portion of the fresh gas line section having the air outlet, the housing cover being removably fastenable to the housing main part.

13. The fresh gas supply device according to claim 12, wherein the flap element is pivotable about a rotational axis.

14. The fresh gas supply device according to claim 12, wherein the housing cover is fastenable to the housing main part at dividing faces of the housing extending in a plane lying substantially transversely with respect to a longitudinal axis of the fresh gas line section.

15. The fresh gas supply device according to claim 14, further comprising at least one recess in the housing, wherein the at least one quantity regulating device is installed in the at least one recess between the at least one compressed air inlet and the air outlet.

16. The fresh gas supply device according to claim 11, wherein the flap element is pivotable about a rotational axis.

\* \* \* \* \*